United States Patent [19]

Wilson

[11] Patent Number: 5,552,022

[45] Date of Patent: Sep. 3, 1996

[54] DESALINATION SYSTEM UTILIZING TRANSFER CONDUIT EXTENDING ABOVE SALT WATER SIPHON HEIGHT

[76] Inventor: Henry A. Wilson, 7461 W. Belvedere Rd., West Palm Beach, Fla. 33411

[21] Appl. No.: 384,316

[22] Filed: Jan. 31, 1995

[51] Int. Cl.[6] .................. B01D 3/42; B01D 3/00
[52] U.S. Cl. .................. 202/176; 137/142; 137/152; 202/180; 203/DIG. 17; 210/136; 210/180
[58] Field of Search .................. 210/136, 175, 210/180, 774; 202/176, 177, 180, 181, 270; 203/10, DIG. 1, DIG. 17, 3; 159/903; 137/142, 151, 152

[56] References Cited

U.S. PATENT DOCUMENTS

| | | | |
|---|---|---|---|
| 1,544,029 | 6/1925 | Nelson | 203/10 |
| 1,966,938 | 7/1934 | Stone | 203/10 |
| 2,342,062 | 5/1943 | Schenk | 159/903 |
| 2,342,201 | 2/1944 | Kain | 203/DIG. 17 |
| 2,490,659 | 12/1949 | Snyder | 159/903 |
| 3,021,860 | 2/1962 | Gandy | 137/152 |
| 3,096,257 | 7/1963 | Foutz | 203/DIG. 1 |
| 3,236,768 | 2/1966 | Litt . | |
| 3,450,602 | 6/1969 | James | 203/DIG. 17 |
| 4,135,985 | 1/1979 | La Rocca | 159/903 |
| 4,303,092 | 12/1981 | Logan | 137/142 |
| 4,504,362 | 3/1985 | Kruse | 203/3 |
| 4,514,260 | 4/1985 | el Din Nasser | 202/270 |
| 4,525,243 | 6/1985 | Miller | 203/DIG. 17 |
| 4,536,257 | 8/1985 | Atwell | 203/DIG. 17 |
| 5,006,264 | 4/1991 | Acuna . | |
| 5,282,979 | 2/1994 | Wilson | 202/270 |

FOREIGN PATENT DOCUMENTS 1587-009  8/1990  U.S.S.R.  .................. 203/DIG. 1

Primary Examiner—Joseph W. Drodge
Attorney, Agent, or Firm—Quarles & Brady

[57] ABSTRACT

An improved desalination system includes a transfer conduit between a pool of salt water and a pool of desalinated water. The transfer conduit is initially filled with water and is elevated so that a portion of the conduit is above the siphon height of water at atmospheric pressure with the open ends of the conduit submerged below the respective pools. Using solar heat to create a temperature differential in the transfer conduit, desalinated water vapor is transferred across a partial vacuum volume formed in the transfer conduit. Salt water is replenished in the transfer conduit from an elevated storage tank, resulting in a constant reduced salt concentration and transfer vacuum at the evaporation surface, reducing the need to repeatedly lower, recharge and raise the system. Various mechanisms are provided for improving heat transfer and condensation and for eliminating movement of the transfer conduit.

20 Claims, 5 Drawing Sheets

DESALINATION SYSTEM UTILIZING TRANSFER CONDUIT EXTENDING ABOVE SALT WATER SIPHON HEIGHT

FIELD OF THE INVENTION

The present invention relates generally to methods and apparatus for decontaminating contaminated fluids. More particularly, the invention relates to methods and apparatus for desalinating salt water.

BACKGROUND OF THE INVENTION

Populations living in arid environments, such as deserts and drought-stricken areas, must rely on importation for their fresh water supply. This importation can be costly and, in some instances, economically impossible to obtain. In areas where a salt water source is nearby, desalination equipment is sometimes employed to provide potable water to the inhabitants. However, some societies are too poor to purchase and maintain the equipment and bear the associated fuel requirements. An economical desalination system that is capable of using natural resources, such as solar energy, to produce potable water from salt water is described in my previous patent, U.S. Pat. No. 5,282,979.

SUMMARY OF THE INVENTION

It is an object of the invention to provide to practical and realistic means for supplying potable water to economically deprived populations suffering chronic droughts.

It is another object of the invention to provide an improved desalination system that can provide potable water using only natural sources of energy, such as the sun.

It is a further object of the invention to provide an improved desalination system that can be simply maintained with minimal instruction.

It is a still further object of the invention to provide an improved desalination system that is constructed of relatively few and simply assembled components.

These and other objects of the invention are achieved by an improved desalination system generally comprising a conduit extending upwardly from a salt water supply and a second conduit extending upwardly from a fresh water store interconnected above the standard atmospheric siphon height for water by a transfer duct or conduit.

As used throughout the specification and claims, this siphon height refers to the height of a column of water in a vertical tube between a partial vacuum and a pool of water exposed to atmospheric pressure. The tube has an open end and a closed end; the tube is filled and inverted with its open end submerged in the open pool of water. At standard atmospheric pressure, this siphon height is approximately 34 feet. Because the siphon height is relatively constant with respect to the pool surface, the column of water can be raised and lowered with respect to the vertical tube by raising and lowering the pool.

In one embodiment, as described in my previous patent, U.S. Pat. No. 5,282,979, the system is originally charged full of water in a lying position, temporarily sealed and then righted. The lower, sealed openings of the conduits are submerged in the salt and fresh water pools, respectively. When the openings are unsealed, the water in the system lowers to the siphon level, leaving a lowered vapor pressure, below atmospheric pressure, in the transfer duct between the two stands of water.

The column of salt water is heated to evaporate the water at the upper surface of the column. The fresh water column is cooled to condense the water vapor in the transfer volume. Thus, the temperature differential between the two columns generates a salt free water vapor migration across the transfer duct or conduit.

To eliminate fuel requirements, the desalination system can be constructed outside and exposed to the sun to generate the necessary temperature differential. Other means can also be employed to heat the salt water column and relatively cool the fresh water column.

The tubing of the salt water column can be enlarged at or slightly below the surface level to increase the evaporation surface area. Similarly, increased surface area for condensation can be generated on the fresh water side by dividing the transfer duct or conduit into a series of channels or a descending coil. As well, more active means for cooling, such as internal coils carrying a cooling medium such as water, may be used to further enhance condensation.

Eventually, oxygen and other gases in the water migrate to the reduced vapor pressure transfer volume, causing an increase in the volume vapor pressure and a reduction in the water transfer efficiency. The system provides means for detecting this change as well as a means for recharging the vacuum in the system. These gases are a by-product of the system operation, and could also be drawn off from the column and collected.

In one embodiment, salt water is replenished to the top of the salt water column from an elevated tank. In this manner, the water at the top of the salt water column is maintained in an unconcentrated form and more concentrated salt water is driven down for removal in the salt water supply. The accumulated salt migrates to the bottom of the column where it may be removed from the system in concentrated form. Removal may be effected, for example, by exchanging the container of salt saturated water with one having normal salt water or by physically removing the accumulated salt from the salt water pool. The salt can be filtered or physically removed in a variety of known methods.

Another advantage of this embodiment is continuous operation without the need for periodic lowering and raising of the system, as proposed in my previous design.

The improved system can also include means for heating both the elevated tank and in conjunction with an auxiliary evaporation chamber, which provides preheating of the salt water prior to introduction to the column. This preheating can further improve the efficiency of the desalination process.

The improved system can further include slanted shelves or trays that are aligned to increase the flow path and exposed surface area of water passing to the salt water column, enabling an increase in evaporation.

In another embodiment, a single condenser can be expanded to include multiple condensers. With such expansion, the condensation rate of the water vapor increases and a larger volume of water can be desalinated during a given period of time.

In another embodiment, condensation is improved by increasing the contact surface area for condensation by intermittently placing disks or blades, which can have apertures, throughout the condensation passages.

In another embodiment, condensation and heat dissipation is improved by introducing coils carrying cooling water within or surrounding the condensation passages in contact with the passage walls.

Each of these improvements, individually or in various combinations, further enhance the performance and ease of use of a desalinator as described in my previous patent. The details of these improvements are described below.

BRIEF DESCRIPTION OF THE DRAWINGS

A more thorough understanding of the invention can be gained from the following detailed description in conjunction with the accompanying drawings, in which:

FIGS. 4A'–E' are cross-sectional views of the condensation passages in FIGS. 4A'–E'.

DETAILED DESCRIPTION OF THE PREFERRED EMBODIMENTS

The invention is primarily directed to apparatus and methods of desalinating salt water, but the structure and steps utilized to desalinate salt water may have other applications in separating contaminants, such as biological, organic, or inorganic, from water or other fluids. "Salt water" is referenced herein generally as any salt water mixture in which the concentration of salt is too high for prolonged human consumption while "fresh," "potable" and "desalinated" are used interchangeably to reference water in which the salt concentration is sufficiently low for prolonged human consumption.

Figure 1:
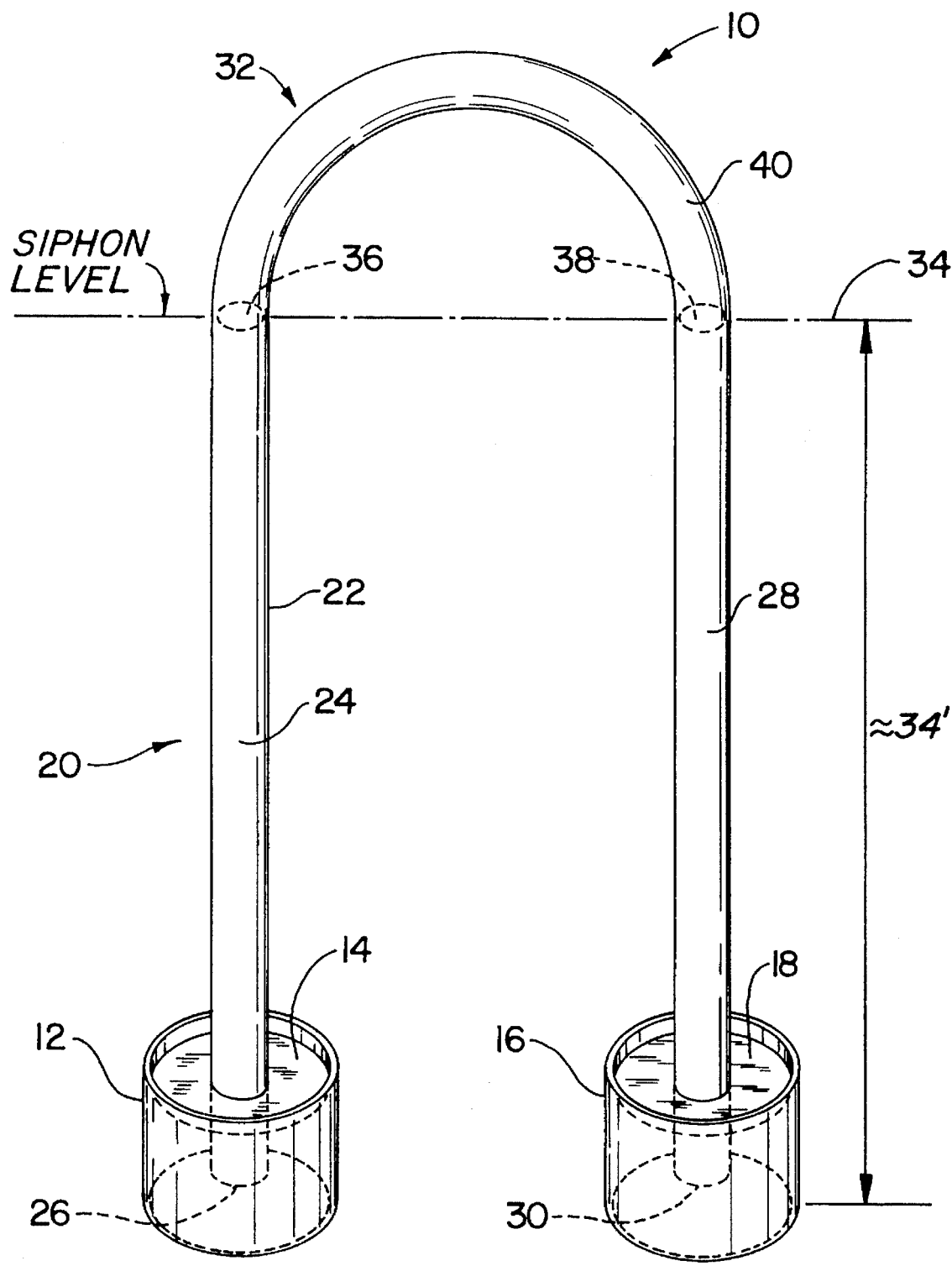
FIG. 1 is a front perspective view of simplified apparatus for desalination according to the invention.

Referring to FIG. 1, the desalination system 10 generally includes a container 12 for storing a pool 14 of salt water and a container 16 for storing a pool 18 of fresh water interconnected by a transfer conduit 20. The transfer conduit 20 can be formed by an inverted U-shaped tubing 22 defining a salt water column 24 with a first end opening 26 submerged in the salt water pool 14 and a fresh water column 28 with a second end opening 30 submerged in the fresh water pool 18.

Prior to placement in the operational position as shown, the transfer conduit 20 can be laid substantially horizontal and completely filled with water. With its end openings 26, 30 temporarily capped, the transfer conduit 20 is righted so that a portion 32 is elevated above the siphon height 34 of water at atmospheric pressure.

Alternatively, the system can be filled by pumping or pressurizing the water to initially fill the tube 20.

The end openings 26, 30 are submerged in the respective pools 14, 18, and caps or other stops (not shown) are removed, allowing the water columns 24, 28 in the transfer conduit 20 to drop to reach an equilibrium against the atmospheric pressure on the surfaces of the pools 14, 18. The top surfaces 36, 38 of the salt water column 26 and the fresh water column 28 stabilize at the siphon height 34, creating a partial vacuum with reduced vapor pressure in a transfer volume 40 between the top surfaces 36, 38. Because the siphon height 34 is relatively constant for a given partial vacuum and atmospheric pressure, the top surface 36, 38 of either-column may be raised or lowered with respect to the transfer conduit 20 by raising or lowering the respective pool 14, 18.

Figure 2:
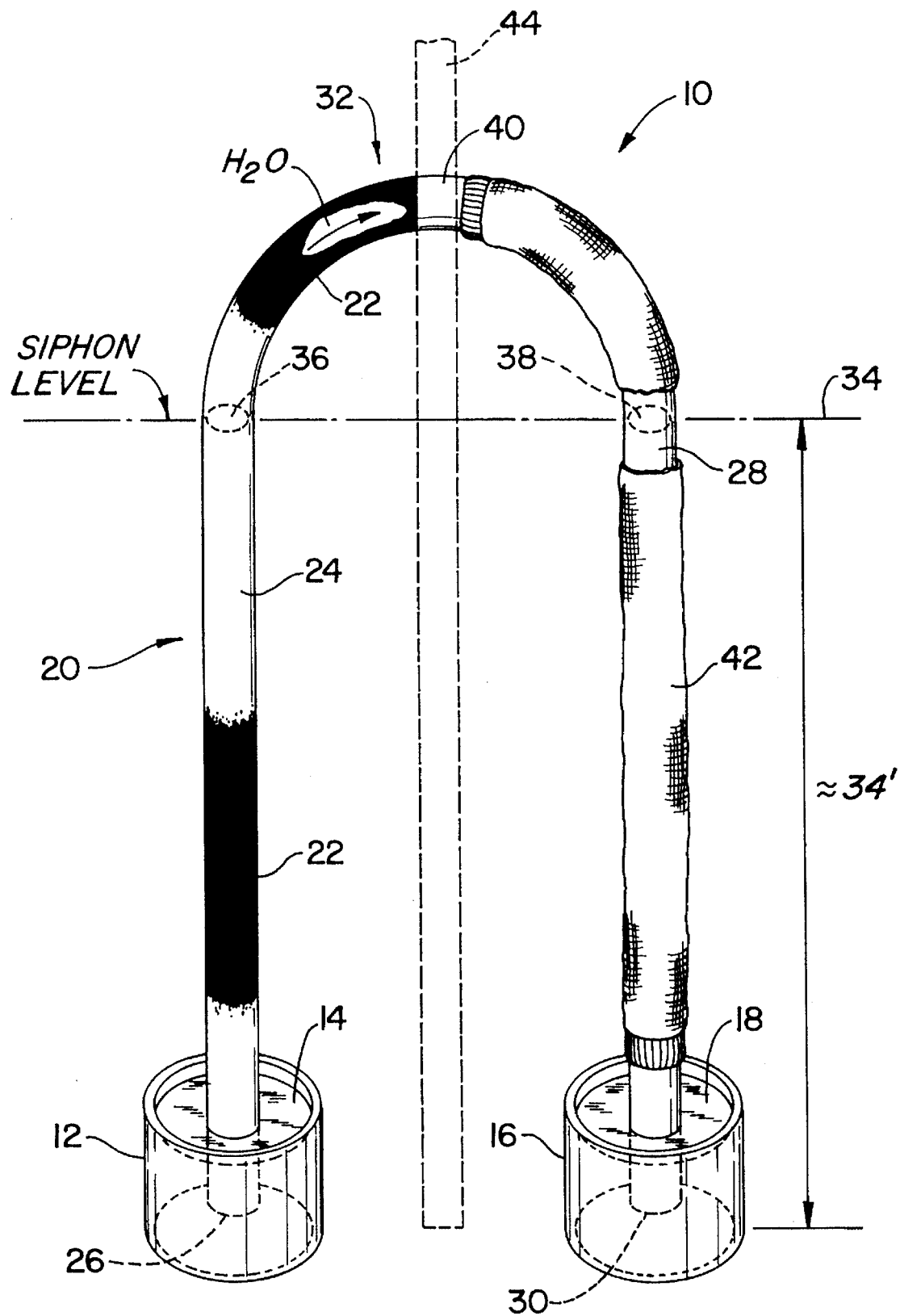
FIG. 2 is a front perspective view similar to FIG. 1, showing structure for creating a temperature differential in the apparatus.

Referring to FIG. 2, in order to induce a transfer of fresh water vapor from the salt water column 24 to the fresh water column 28, the salt water column 24 is heated to evaporate water at the top surface 36. Because of the reduced pressure in the transfer volume 40, the evaporation temperature is reduced, thereby facilitating vapor transfer. The fresh water column 28 and a portion of the tubing 22 surrounding the transfer volume 40 are cooled relative to the salt water column 24 to condense the evaporated vapor proximate to the fresh water column 28 for collection in the fresh water column 28 and its associated pool 18. Cooling of the fresh water pool may be accomplished by maintaining the cooling water in an underground reservoir. In this way, the water is cooled by dissipating heat by conduction to the surrounding ground. Once the water has been cooled, it may be pumped from the reservoir for other cooling uses.

Heating and cooling for generating the temperature differential between the salt water column 24 and the fresh water column 28 can be provided in a variety of ways. Because it is an object of the invention to provide a fuel independent desalinator, the presently preferred means for maintaining the temperature of the salt water column above the temperature of the desalinated water column is heat from the sun acting upon dark and light surfaces. The portion of the tubing 22 surrounding the salt water column 24 can be constructed of a material that is a good heat conductor and can further be painted a dark color, such as black, illustrated in FIG. 2. The portion of the tubing 22 surrounding the condensation side of the transfer volume 40 and the portion of the tubing 22 surrounding the fresh water column 28 can be constructed from a heat insulating material, and can further be painted a light color, such as white.

Alternatively and preferably, the transfer volume 40 and fresh water portions of the conduit 20 can be covered by an absorbent material, such as a cotton sleeve 42, wetted with a running fluid, such as excess salt water from a reservoir (not shown). A fraction of the fresh water condensate may also be drawn off and used for this purpose. The running water can also convectively carry any heat away from the fresh water portions of the conduit 20.

The transfer volume and fresh water portions of the conduit 20 can also be shielded from direct radiation of the solar heat by an enclosure, canvas, or other flexible material, or a more rigid or permanent structure. As the desalination system 10 can be installed adjacent a side wall 44 of a building, the protected portions can be placed in the building while the salt water portion remains outside. This placement would also internalize the fresh water output for protection against outside contamination and theft.

Figure 3:
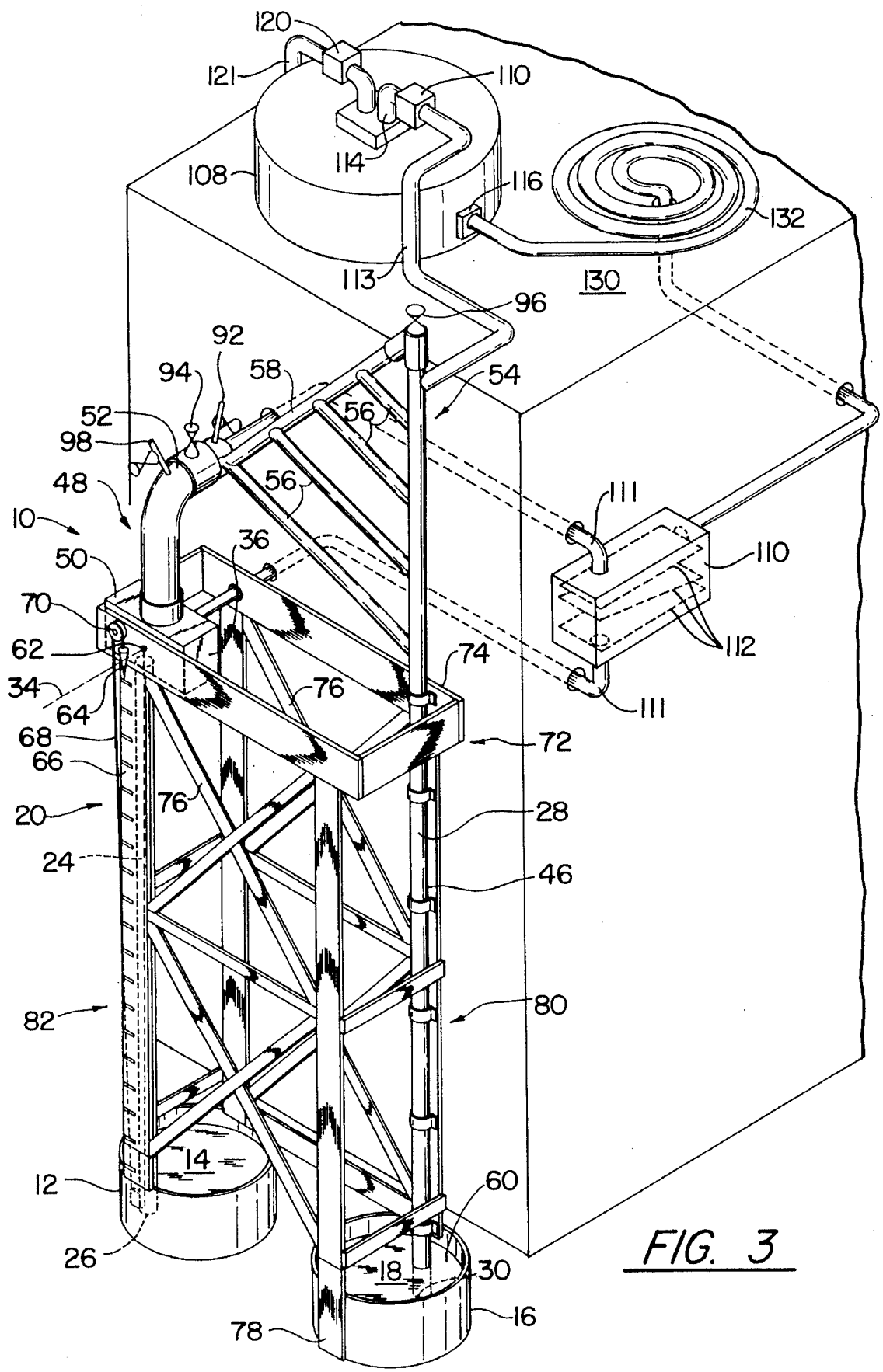
FIG. 3 is a front perspective view of an embodiment which includes an elevated salt water storage tank, a roof top salt water preheating system, an evaporation chamber, an enclosure shielding the desalinated portion of the system from direct radiation of solar heat and a vacuum conduit connecting the desalinated water column to the salt water storage tank.

As shown in FIG. 3, the transfer conduit 20 can alternatively and preferably be constructed of tubing 46 supporting the salt water column 24 and the fresh water column 28 with an enlarged transfer volume portion 48. Directly below the siphon height 34 of the salt water column 24, the salt water column 24 interfaces with a horizontally expansive conduit, such as an evaporation box 50, in which the top surface 36 of the salt water is increased in surface area for more efficient evaporation. The vapor created in the evaporation box 50 travels to a transfer curve 52. The transfer conduit 20 can initially be charged as described above with respect to the embodiment of FIG. 1. For example, the conduit 20 can be left upright with the lower ends capped. A valve 94 can be closed to isolate the fresh and salt water sides. A valve 92 can be used to fill the salt water side completely with salt water. A valve 98 can be used to fill the fresh water side completely with fresh water. The lower, submerged ends can then be opened, causing the salt water level and fresh water level in the transfer conduit to lower to the atmospheric syphon level and establishing a partial vacuum. The valve 94 can then be opened to join the two independently established vacuums into a single transfer volume.

During desalination, the vapor and any condensed fresh water are conveyed to a condensation chamber 54 that preferably includes a series of inclined passageways 56 connected by an inclined supply pipe 58. As vapor rises in the supply pipe 58 and travels throughout the condensation chamber 54, the lower temperature provided by light paint, an evaporative sleeve or an enclosure (see FIG. 2) combines with the increased surface area provided by the series of passageways 56 to condense the fresh water vapor. The condensate travels down the inclined passageways 56 for collection in the fresh water column 28.

Condensation may be improved by increasing the contact surface area or heat transfer by various means. Total condensation chamber volume can be expanded by adding multiple condensation chambers 54 and multiple fresh water columns 28. Referring to FIGS. 4A–4E, the condensations surface area can be increased by intermittently placing surfaces within the inclined passageways 56 in order to enhance condensation rate.

Figure 4A:
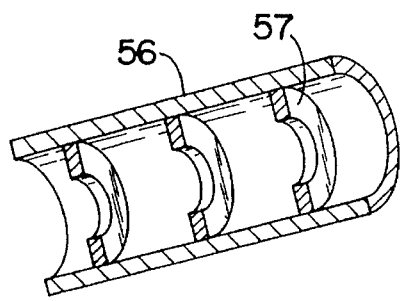
FIGS. 4A–E are cross-sectional views of alternative condensation passageways according to the invention.
Figure 4A:
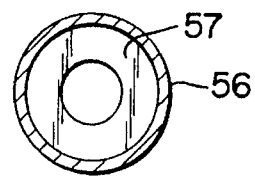

As shown in FIGS. 4A and 4A' condensation surface area can be increased by intermittently placing washer-like disks 57 within an inclined passageway 56. Water vapor passes through the center of the disk as it travels through the passageway and, as the water vapor condenses, pools of desalinated water form at the base of the disk 57 and spill over into the open chamber formed by the next disk 57.

Figure 4B:
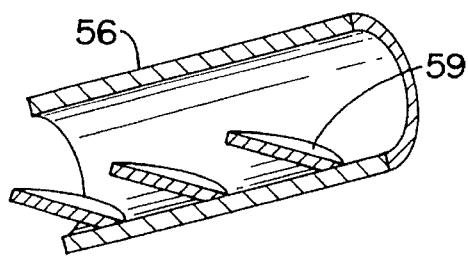
Figure 4B:
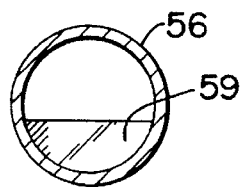

Alternatively, as shown in FIGS. 4B and 4B', surface area for water vapor condensation is augmented by blades 59 placed successively within the inclined passageway 56. As the condensate forms, it cascades over each blade 59 and causes increased water vapor condensation.

Figure 4C:
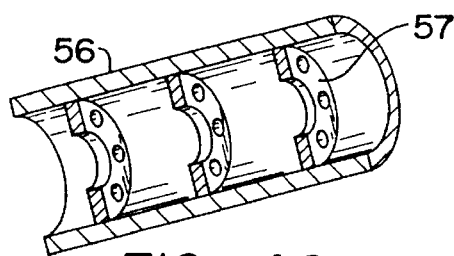
Figure 4C:
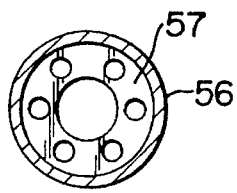

The disks 57 across the passages can include a plurality of apertures as shown in FIGS. 4C and 4C'. These apertures increase the surface area of the disks 57 for condensation.

Figure 4D:
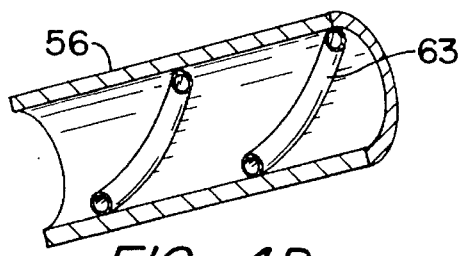
Figure 4D:
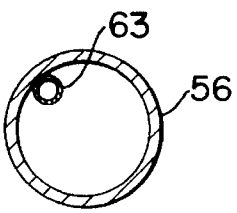
Figure 4E:
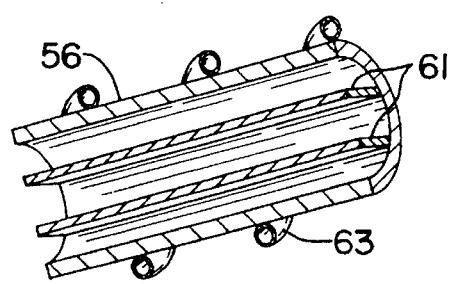
Figure 4E:
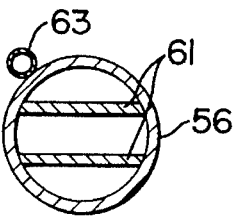

Similarly, as shown in FIGS. 4E and 4E', longitudinal flat plates 61 may be disposed within the passages to enhance heat dissipation and improve condensation. This creates multiple passages for the water vapor to condense.

Also, coils 63 carrying cooling water may be disposed within, as shown in FIGS. 4D and 4D', or surrounding the passages, as shown in FIGS. 4E and 4E' in contact with the passage walls to enhance heat dissipation and improve condensation. The cooling coils can be supplied by relatively cooler water from, for example, the pool of desalinated water. The cool water can be fed through standard conduits by manual pumping and recirculated back into the desalinated water pool.

Where water is used as a cooling medium, as in the coil above, it is necessary to remove the heat from the water prior to its circulation for cooling purposes. This may be accomplished in a variety of ways including maintaining the cooling water in an underground reservoir. In this way, the water is cooled by dissipating heat by conduction to the surrounding ground. Once the water has been cooled it may be pumped from the reservoir back to the coils in the condensation chamber. Other means for reducing cooling water heat, such as evaporative coolers, might also be applicable to this process.

Referring to FIG. 3, the fresh water condensate is collected on the top surface 38 (see FIG. 1) of the fresh water column 28, causing it to rise. The pressure differential between the transfer volume 48 and the atmosphere induce an equilibrium causing the fresh water pool surface 60 to rise, representing the accumulated fresh water.

Eventually, oxygen and other gases are released from the water columns 24, 28 and increase the vapor pressure in the transfer volume 48. The increased pressure reduces the efficiency of the vaporization/condensation process. The increased pressure can manifest itself in a lowering of the column top surfaces 36, 38, which can be detected and monitored by detection means, such as a float 62 connected to a weight marker 64 of a gauge 66. Through a line 68 around pulleys 70, the descent of the float 62 causes a descent of the marker 64 on the gauge scale 66. The accumulated gases may be drawn off from the column and collected as a by-product.

To eliminate the increased pressure, the system 10 can be recharged. As described in my previous patent, U.S. Pat. No. 5,282,979, the system can be recharged by lowering the conduit to substantially horizontal orientation for refilling and erection to its operational, vertical position. Reference to my previous patent should be made for details of such construction.

While the pivoting embodiment of the invention certainly provides a cost effective, reliable system for desalinating or otherwise decontaminating water, it is also desirable to provide a system that avoids the need to invert the columns for recharging. According to an improvement of the invention, the system can be recharged in a vertical, operational position while simultaneously flushing high salt concentration from the evaporation surface and maintaining low concentration salt water on said surface, so as to maintain evaporation and desalination efficiency. This new embodiment further provides a recharging of the vacuum transfer area by driving excess gases from the transfer volume into a water reservoir as further salt water is added to the evaporation chamber.

Figure 5:
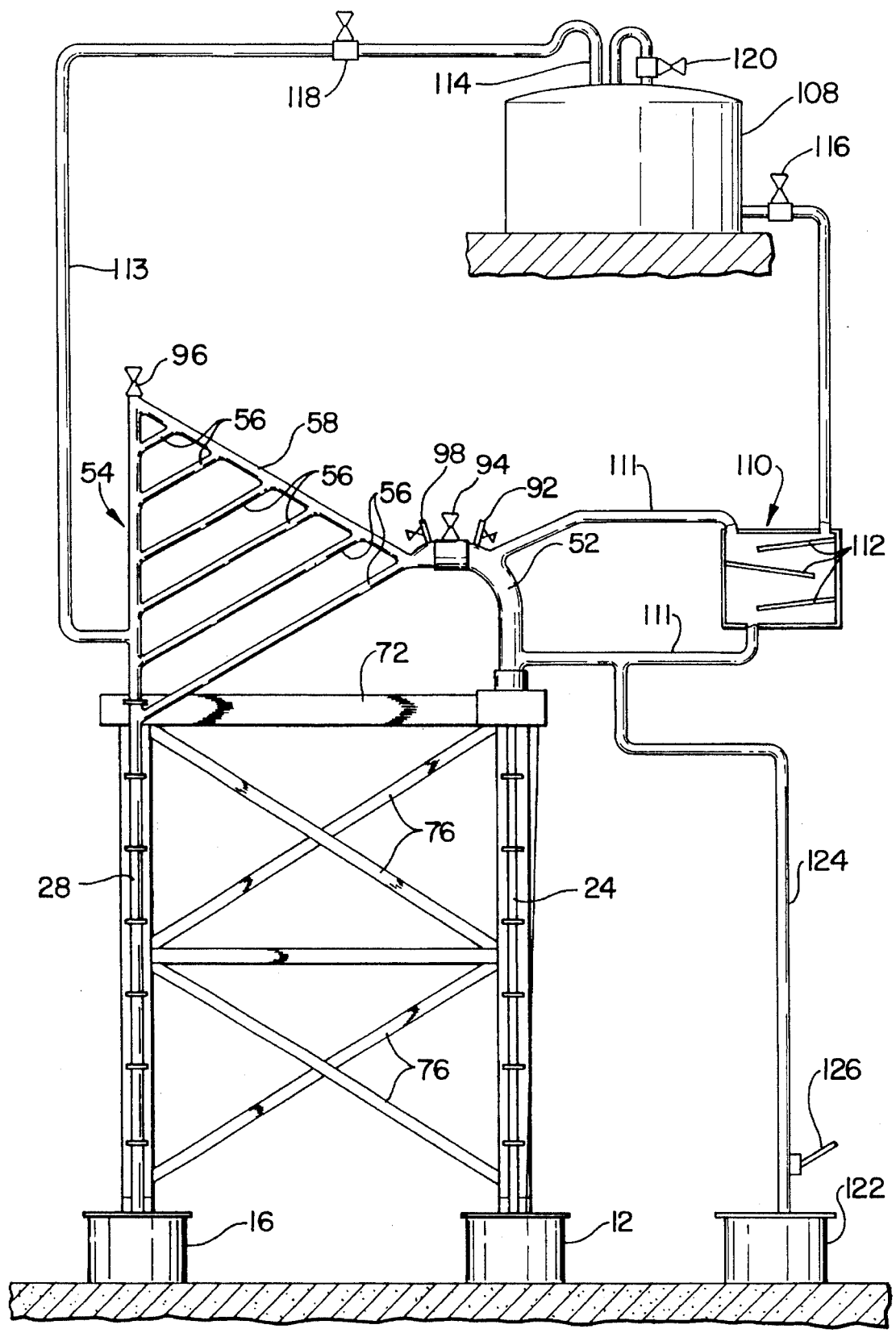
FIG. 5 is a front elevational view of an embodiment which includes an elevated salt water storage tank and evaporation chamber.

FIGS. 3 and 5 show an embodiment of the invention including an elevated salt water storage tank 108 from which the salt water column is alternatively replenished. As the water is transferred from the storage tank 108 to the column 24, it can also pass through an evaporation compartment 110. This compartment, which is shown with a cutaway, contains shelves or trays 112 aligned to increase the flow path and exposed surface area of water passing through the compartment, and therefore increase evaporation. The trays 112 may be inclined to effect the most efficient flow characteristics. Sufficient flow rate is maintained to carry the salt water to the salt water column 24. The salt water vapor created from preheating is carried to the transfer curve 52 for desalination by conduits 111.

The elevated storage tank 108 can include a vent 114 at the top, which is connected to the condensation chamber 54. The water displaced from the storage tank 108 is replaced by drawing the accumulated gases released from the water in the condensation chamber 54 through a vacuum conduit 113 and a vent 114. The vent 114 and connection to the condensation chamber 54 is constructed of rigid pipe, tube, or any other pressure resistant conduit. Drawing of the accumulated gases is accomplished by the associated vacuum that is created when the water replenishing the salt water column 24 exits the storage tank 108 through the evaporation compartment 110.

Refilling the elevated storage tank 108 while preserving the decreased pressure of the desalinator may be accomplished through a series of valves. In a first embodiment, the condensation chamber 54 is sealed from the storage tank 108 during the desalination process by closing both the tank exit valve 116 and vacuum conduit valve 118. Over time, the partial pressure in the transfer chamber increases as dissolved gases migrate from the water columns to the lower pressure transfer volume. This decreased vacuum reduces desalination efficiency.

In order to maintain the salt water column height at the siphon level and reestablish the vacuum in the transfer chamber, the tank exit valve 116 can be opened. The recharging is done in a controlled manner to exchange the dissolved gases in the condensation chamber 54 with replenishing salt water from the storage tank 108. During the exchange, the storage tank 108 is sealed from the outside atmosphere by closing a valve 120.

Alternatively, and preferably, the claimed invention can further include a recirculating means to automatically allow dissolved gases to transfer to the top of the storage tank 108 as salt water exits the storage tank 108 through the tank exit valve 116. Preferably, the vacuum conduit valve 118 of the recirculating means operates automatically and unidirectionally, only allowing gas from the condensation chamber 54 to pass through to the storage tank 108 and preventing any water from the storage tank from exiting through the vacuum conduit 113. In one configuration, the vacuum conduit valve 118 may be manually operated. Either way, the vacuum conduit valve 118 must be shut during refilling to insure vacuum retention when the tank entry valve 120 is opened and the storage tank 108 is filled to the brim. In this arrangement, prior to refilling the salt water column, salt water flow to the evaporation compartment 110 is terminated by closing the tank exit valve 116. Next, the vacuum conduit is sealed by closing the vacuum conduit valve 118. The tank entry valve 120 can control flow in a conduit 121 extending to ground level to receive salt water manually pumped to the storage tank 108. The tank entry valve 120 can include a relief port for releasing the captured gases during refilling. After the tank is full, the tank entry valve 120 is shut. Then as needed, the condensation chamber vacuum is recharged to an effective vacuum level by opening the valves 116 and 118.

Another arrangement allows the system to operate in a steady state and maintain the siphon level and transfer vacuum. The tank exit valve 116 is adjusted to allow a continuous flow or trickle of salt water to the salt water column while the vacuum conduit 118 allows evaporated gases to simultaneously transfer to the storage tank 108. To avoid loss of the vacuum during refill of the storage tank 108, the storage tank 108 must be isolated from the transfer conduit 20 by closing both the tank exit valve 116 and the vacuum conduit valve 118. The tank entry valve 120 is then opened to purge the collected refill the storage tank 108 and gases. After refill, the tank entry valve 120 is closed and the recharging system is restarted by opening the tank exit valve 116 and the vacuum conduit valve 118. In this manner, the storage tank 108 may be refilled without losing the condensation chamber vacuum.

The salt water stored within the storage tank 108 can be preheated, such as by painting the tank a dark, heat absorbing color to enhance the efficiency of the system. Similarly, the evaporation compartment 110 may be naturally heated to increase the evaporation rate. To further increase the natural heating efficiency, for example, the salt water travelling to the evaporation compartment 110 may be diverted to a location that is naturally hot, such as a roof top 130 covered with a heat conducting material, such as black tar. This diversion may be accomplished in a conduit configuration that enhances heat transfer to the salt water, such as a spiraling coil 132 that is painted in a heat absorbing color and affixed to the roof top 130.

As shown in FIG. 5, alternatively, the replenishing salt water may be supplied to the top of the column 24 from a second salt water reservoir 122 at ground level by a second salt water column contained in a tube 124 or similar fixture. Connected to the salt water column 24 at the siphon level 34, this column provides a flow of salt water in response to the reduced level of the evaporating salt water column 24. The vacuum above the evaporation salt water column 24 acts to draw the replenishing salt water up the second column tube 120 to the siphon level 34 and the salt water column in the tube 124 may also be maintained by a pump 126. Again, because the evaporating salt water column 24 is replenished at the top, the surface water remains unconcentrated.

Although the description of this invention has been given with reference to particular embodiments, this description is not to be construed as limiting the scope of this invention. Many variations and modifications may now occur to those skilled in the art in view of this disclosure. Accordingly, the scope of the present invention should not be determined by the above description, but rather by a reasonable interpretation of the appended claims.

I claim:

1. A desalination system, comprising:

a pool of a salt water exposed to atmospheric pressure;

a separate pool of desalinated water in a desalinated water container;

a transfer conduit for transferring water from said salt water pool to said desalinated water pool without transferring salt to said desalinated water pool, said transfer conduit having end openings respectively submerged in said salt water pool and said desalinated water pool said transfer conduit extending upwardly and having a portion above a siphon height of said salt water at atmospheric pressure, wherein said transfer conduit encloses a column of said salt water extending from said salt water pool and a column of said desalinated water extending from said desalinated water pool separated by a transfer volume vacuum;

means for filling said conduit with water above said siphon level and allowing the water to lower to said siphon height to establish a transfer volume in said transfer conduit;

means for maintaining the temperature of said salt water column above the temperature of said desalinated water column;

a salt water storage device; and means for exchanging salt water transferred from said salt water storage device to said salt water column with gases transferred from the transfer conduit to said salt water storage device.

2. A desalination system according to claim 1, said salt water storage device is elevated with respect to the top of said salt water column.

3. A desalination system according to claim 1, wherein said exchanging means includes a recirculating means having a vacuum conduit with a valve, said vacuum conduit valve allowing the gases from said transfer conduit to pass through to said salt water storage device and preventing salt water from within said salt water storage device from exiting through the vacuum conduit.

4. A desalination system according to claim 3, wherein said vacuum conduit valve is manually closeable to allow isolation of said salt water storage device from said transfer conduit during refilling of said storage device.

5. A desalination system according to claim 1, wherein said transfer conduit has cooling coils, said cooling coils having a cooling medium therewithin to reduce the temperature in the transfer conduit to provide for condensation.

6. A desalination system according to claim 5, wherein said cooling medium is desalinated water from said desalinated water pool.

7. A desalination system according to claim 5, comprising a second storage device substantially in contact with the ground and further comprising means for transferring heat from said second storage device to the ground, and means for transporting said cooling medium from said second storage device to said cooling coils and back to said second storage device.

8. A desalination system according to claim 7, wherein said second storage device is said desalinated water container and said cooling medium is desalinated water from said desalinated water pool.

9. A desalination system according to claim 1, wherein said transfer conduit has a plurality of longitudinal plates disposed within said transfer conduit such that said longitudinal plates increase a surface area provided for condensation.

10. A desalination system according to claim 9, wherein said longitudinal plates have apertures.

11. A desalination system according to claim 1, wherein said transfer conduit has at least one of disks and blades disposed within said transfer conduit such that said at least one of disks and blades increase a surface area provided for condensation.

12. A desalination system according to claim 1, further comprising a means for elevating the temperature of said salt water within said salt water storage device.

13. A desalination system according to claim 12, wherein said temperature maintaining means comprise heating means comprising a tank constructed of a material that is a heat conductor and is painted a heat absorbing color, whereby solar heat radiating on said heating means increases the temperature of the salt water within said heating means.

14. A desalination system according to claim 13, wherein said heating means is physically positioned in a naturally hot location continuously exposed to the sun during daylight.

15. A desalination system according to claim 14, wherein said heating means is positioned on a roof top.

16. A desalination system according to claim 15, wherein said heating means is constructed to maximize the surface area of said heating means facing towards the sun.

17. A desalination system according to claim 16, wherein said heating means is constructed in a spiralling coil configuration.

18. A desalination system according to claim 1, further comprising an evaporation compartment having a first port connected to said salt water storage device, a second port connected to said salt water column, and a plurality of inclined trays within said evaporation compartment and placed such that salt water exiting from said salt water storage device flows through said first port, falls sequentially over said inclined trays and then flows through said second port to said salt water column.

19. A desalination system according to claim 18, further comprising a heating means for elevating the temperature of said evaporation compartment and the salt water within said evaporation chamber.

20. A desalination system according to claim 1, wherein said heating for maintaining means includes a relatively darker portion of said conduit surrounding said salt water column than the portion surrounding said column of desalinated water, whereby solar heat radiating on said portion maintains the temperature of the salt water above that of the desalinated water.

* * * * *